United States Patent
Kahl et al.

(10) Patent No.: US 10,087,773 B2
(45) Date of Patent: Oct. 2, 2018

(54) VALVE FOR A TURBOMACHINE

(71) Applicant: Siemens Aktiengesellschaft, Munich (DE)

(72) Inventors: Jan Kahl, Much (DE); Andreas Kaliwoda, Solingen (DE); Nikolaj Lekic, Mulheim (DE); Oliver Myschi, Duisburg (DE); Maximilian Niederehe, Duisburg (DE)

(73) Assignee: Siemens Aktiengesellschaft, Munich (DE)

( * ) Notice: Subject to any disclaimer, the term of this patent is extended or adjusted under 35 U.S.C. 154(b) by 269 days.

(21) Appl. No.: 14/905,429

(22) PCT Filed: Jul. 3, 2014

(86) PCT No.: PCT/EP2014/064160
§ 371 (c)(1),
(2) Date: Jan. 15, 2016

(87) PCT Pub. No.: WO2015/010869
PCT Pub. Date: Jan. 29, 2015

(65) Prior Publication Data
US 2016/0169030 A1    Jun. 16, 2016

(30) Foreign Application Priority Data
Jul. 25, 2013 (EP) .................... 13177934

(51) Int. Cl.
*F16K 31/12* (2006.01)
*F01D 17/14* (2006.01)
(Continued)

(52) U.S. Cl.
CPC .......... *F01D 17/145* (2013.01); *F01D 17/10* (2013.01); *F16K 1/443* (2013.01); *F16K 31/363* (2013.01);
(Continued)

(58) Field of Classification Search
CPC ....... Y10T 137/8667; Y10T 137/86694; F16K 31/122; F16K 31/1223; F16K 31/1226;
(Continued)

(56) References Cited

U.S. PATENT DOCUMENTS 1,752,439 A * 4/1930 Larner .................... F16K 1/126
137/219
2,087,037 A * 7/1937 McCarthy ............. F16K 39/026
137/494

(Continued)

FOREIGN PATENT DOCUMENTS

CA     1044560 A    12/1978
CH     679066 A5 * 12/1991 ........... F16K 31/363
(Continued)

OTHER PUBLICATIONS

English language Machine Translation of DE1200324 from Espacenet on Dec. 13, 2017.*

(Continued)

*Primary Examiner* — Jessica Cahill
(74) *Attorney, Agent, or Firm* — Beusse Wolter Sanks & Maire

(57) ABSTRACT

A valve for a turbomachine, has a valve cone and a valve seat, the valve cone being configured such that it can be moved in a valve body with respect to the valve seat. The opening and closing of the valve being achieved by the use of process-internal media taking into account different geometries of the working chambers and the use of thermodynamically different state variables.

15 Claims, 1 Drawing Sheet

(51) Int. Cl.
  *F01D 17/10* (2006.01)
  *F16K 31/363* (2006.01)
  *F16K 1/44* (2006.01)

(52) U.S. Cl.
  CPC ..... *F05D 2220/31* (2013.01); *Y10T 137/8667* (2015.04); *Y10T 137/86694* (2015.04)

(58) Field of Classification Search
  CPC ...... F16K 31/363; F16K 1/443; F01D 17/145; F01D 17/10; F05D 2220/31
  See application file for complete search history.

(56) References Cited

U.S. PATENT DOCUMENTS

| | | | |
|---|---|---|---|
| 3,656,706 A * | 4/1972 | Johnston | F16K 31/363 251/38 |
| 4,060,453 A * | 11/1977 | Schabert | F16K 17/10 376/283 |
| 4,092,214 A * | 5/1978 | Schabert | F16K 17/168 137/599.16 |
| 4,490,836 A | 12/1984 | Grotloh | |
| 4,500,070 A | 2/1985 | Riollet et al. | |
| 5,934,870 A | 8/1999 | Zimmermann | |
| 6,220,272 B1 | 4/2001 | Tavor | |
| 6,371,734 B1 | 4/2002 | Ota et al. | |
| 7,921,867 B2 * | 4/2011 | Groves, II | F16K 3/265 137/500 |
| 8,256,738 B2 * | 9/2012 | Johnson | F16K 31/122 137/625.25 |
| 8,820,703 B2 * | 9/2014 | Johnson | F16K 31/122 137/625.25 |
| 2002/0006337 A1 | 1/2002 | Kimura et al. | |
| 2003/0145615 A1 | 8/2003 | Sasaki et al. | |
| 2006/0045758 A1 | 3/2006 | Hirota | |

FOREIGN PATENT DOCUMENTS

| | | |
|---|---|---|
| CN | 1436932 A | 8/2003 |
| CN | 201763711 U | 3/2011 |
| DE | 1200324 B | 9/1965 |
| EP | 0054602 A1 | 6/1982 |
| EP | 0828102 A2 | 3/1998 |
| EP | 1083335 A2 | 3/2001 |
| EP | 0854992 B1 | 5/2003 |
| FR | 2309710 A1 | 11/1976 |
| JP | S5842872 A | 3/1983 |
| JP | S61108581 U | 7/1986 |
| JP | 2008175267 A | 7/2008 |
| SU | 1062464 A1 | 12/1983 |

OTHER PUBLICATIONS

JP Office Action dated Jan. 30, 2017, for JP patent application No. 2016-528390.
RU Notice of Allowance dated Apr. 10, 2017, for RU patent application No. 2016106173.
KR Notice of Allowance dated Jul. 20, 2017, for KR patent application No. 10-2016-7001658.
CN Office Action dated Jun. 237, 2016, for CN application No. 201480042271.1.

* cited by examiner

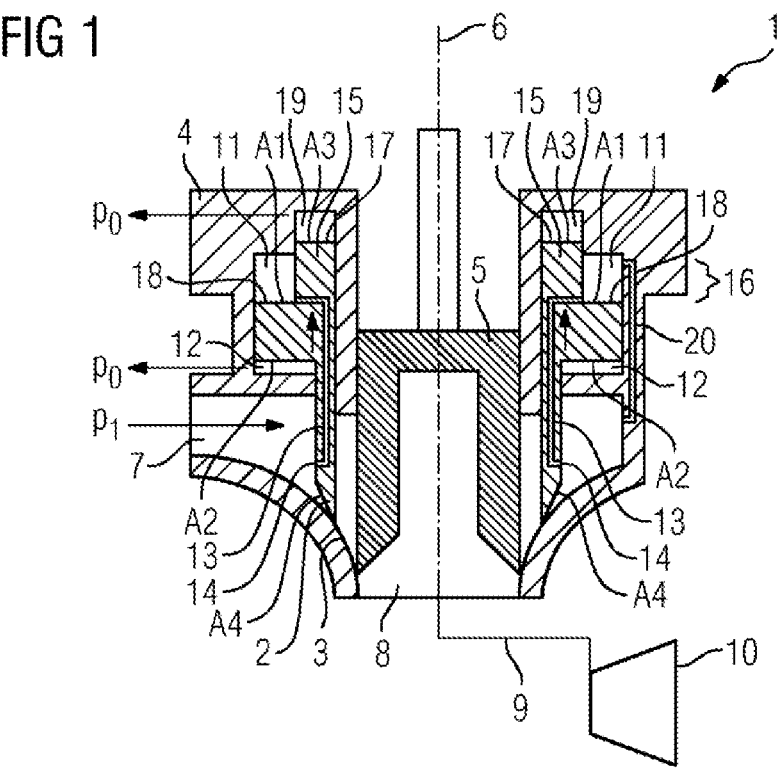
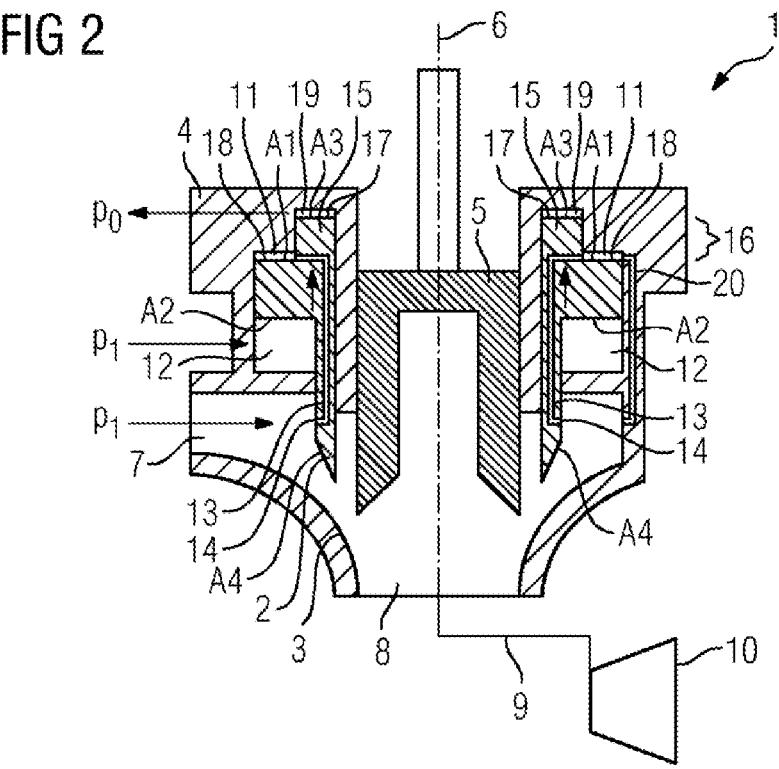

VALVE FOR A TURBOMACHINE

CROSS REFERENCE TO RELATED APPLICATIONS

This application is the US National Stage of International Application No. PCT/EP2014/064160 filed Jul. 3, 2014, and claims the benefit thereof. The International Application claims the benefit of European Application No. EP13177934 filed Jul. 25, 2013. All of the applications are incorporated by reference herein in their entirety.

FIELD OF INVENTION

The invention relates to a valve for a turbomachine, in particular steam turbine, having a valve cone and a valve seat, the valve cone being configured such that it can be moved in a valve body with respect to the valve seat.

BACKGROUND OF INVENTION

Valves for turbomachines, in particular steam turbines, are given special significance, since the feed of steam to a steam turbine has to have substantially two properties. These would be firstly regulating the steam which flows into the steam turbine and, in the case of a disruption of the quick-action closure of the valve, in order to interrupt the feed of steam. There are embodiments of valves, in which said two properties are arranged in a single valve housing. On account of the high temperatures and the high pressures of the steam, the technical requirements of valves of this type are particularly high. The opening and closing at high temperatures and high pressures prove difficult. As a rule, a valve cone has to be configured in valves such that it can be moved in one direction. The forces for being able to move said valve cone are comparatively high and are either of hydraulic or electrohydraulic configuration.

Furthermore, the valves have to be configured in such a way, for reasons of safety, that a fault or a failure of the actuation leads to automatic closure of the valves ("valve closed" safety position).

SUMMARY OF INVENTION

It is an object of the invention to specify an alternative possibility for moving a valve cone against the valve seat. This object is achieved by way of a valve for a turbomachine, in particular steam turbine, having a valve cone and a valve seat, the valve cone being configured such that it can be moved in a valve body with respect to the valve seat, the valve body having a first pressure space which is configured in such a way that, in the case of loading in the first pressure space at the pressure $p_1$ the valve cone moves in the direction of the valve seat, the valve body having a second pressure space which is configured in such a way that, in the case of loading in the second pressure space at the pressure $p_1$ the valve cone moves in the opposite direction of the valve seat.

As viewed in the movement direction of the valve cone, the first pressure space is configured in such a way that it has a projected effective first pressure area $A_1$, the second pressure space having a projected effective second pressure area $A_2$, as viewed in the movement direction of the valve cone, wherein: $A_1 < A_2$.

As a result, the force which is built up via the pressure on the two pressure areas is of different magnitude, with the result that finally a movement of the valve cone is possible.

According to the invention, the opening and closure of the valve is therefore made possible by way of the use of process-internal media with consideration of various geometries of the working spaces and the use of thermodynamically differentiated state variables. Here, in particular, the first pressure space is loaded at a pressure $p_1$ the pressure $p_1$ being formed by way of the inflowing flow medium, steam in this case.

Advantageous developments are specified in the subclaims.

For instance, the valve has an inflow space for feeding in process medium, a feed line being configured in the valve cone or in the valve body, which feed line connects the inflow space to the first pressure space in terms of flow.

It is therefore proposed to configure an additional line, namely the feed line, in the valve cone or in the valve body, which additional line makes a communicating connection between the inflow space and the pressure space possible.

Therefore, the pressure $p_1$ propagates in the first pressure space and finally leads to a force in the direction of the valve seat.

A device is advantageously provided, for feeding steam into the second pressure space, the device being configured in such a way that, in the case of the movement of the valve cone in the direction of the valve seat, the second pressure space is loaded at the pressure $p_0$, wherein: $p_0 < p_1$.

The device is likewise advantageously configured in such a way that, in the case of the movement of the valve cone in the opposite direction to the valve seat, the second pressure space is loaded at the pressure $p_1$. Therefore, the device can comprise at least one valve which produces a connection in flow terms to the process medium either at the pressure $p_1$ or $p_0$.

In a further advantageous development, the valve body has a third pressure space which is configured in such a way that, in the case of loading in the third pressure space at the pressure $p_0$, a pressure force is exerted on the valve cone in the direction of the valve seat. The valve cone is advantageously of tubular configuration, the valve cone having a step on the end side, an upper step being assigned to the third pressure space and a lower step being assigned to the first pressure space.

A further valve cone which is configured for regulation and for quick-action closure of a flow of steam is advantageously arranged within the valve cone.

According to the invention, the valve cone is configured for quick-action closure.

BRIEF DESCRIPTION OF THE DRAWINGS

The invention will now be explained in greater detail using one exemplary embodiment. In the drawing, diagrammatically:

FIG. 1 shows a valve in the closed state, and
FIG. 2 shows a valve in the open state.

DETAILED DESCRIPTION OF INVENTION

FIG. 1 shows a valve 1 comprising a valve cone 2, a valve seat 3 and a valve body 4. A further optional actuator valve cone 5 is arranged within the valve body 4. The valve cone 2 is configured so as to be substantially rotationally symmetrical about a rotational symmetry axis 6. Here, the valve cone 2 can be moved in the direction of the rotational axis symmetry axis 6 in the direction of the valve seat 3 and can also be configured such that it can be moved counter to the valve seat 3.

The valve body 4 and the valve seat 3 are configured as an integral component. An inflow space 7 is arranged in the valve 1, into which inflow space 7 a process medium, for example steam, can flow. Furthermore, the valve 1 comprises an outflow space 8. The steam is fed finally to a steam turbine 10 via a flow connection 9. The valve 1 is configured for a turbomachine, in particular a steam turbine 10.

The valve body 4 has a first pressure space 11. Here, the first pressure space 11 is configured in such a way that, in the case of loading in the first pressure space 11 at the pressure $p_1$ the valve cone 2 moves in the direction of the valve seat 3.

The valve body 4 has a second pressure space 12 which is configured in such a way that, in the case of loading in the second pressure space 12 at the pressure $p_1$ the valve cone 2 moves in the opposite direction away from the valve seat 3.

In the direction of the drawing of FIG. 1, the valve cone 2 would move upward in this case.

A process medium, in particular steam at the pressure $p_1$ is situated as a rule in the inflow space 7.

The valve cone 2 or the valve body 4 has a feed line 13 or 20 which connects the inflow space 7 to the first pressure space 11 in terms of flow. To this end, a flow connection is situated in the valve cone 2, which flow connection can be configured, for example, as an annular channel and extends rotationally symmetrically over the symmetry axis 6. Here, the feed line 13 has an opening 14 which points on the outer side in the direction of the inflow space 7.

The valve 1 has a device (not shown in greater detail) for feeding steam at the pressure $p_0$ or $p_1$ into the second pressure space 12, and a device (not shown in greater detail) for feeding steam at the pressure $p_0$ into a third pressure space 19, the device being configured in such a way that, in the case of the movement of the valve cone 2 in the direction of the valve seat 3, the second pressure space 12 is loaded at the pressure $p_0$, wherein: $p_0 < p_1$.

In the case of a movement in the opposite direction, that is to say away from the valve seat, the second pressure space 12 is loaded at the pressure $p_1$.

In order to make this movement of the valve cone 2 possible, the valve cone 2 is of tubular configuration with respect to the rotational symmetry axis 6, the valve cone 2 having a step 16 on the end side 15, an upper step 17 and a lower step 18 being arranged on the end side 15.

The valve body 4 has a third pressure space 19 which is configured in such a way that, in the case of loading in the third pressure space 19 at the pressure $p_0$, a pressure force is exerted on the valve cone 2 in the direction of the valve seat 3.

The valve cone 2 has a projected effective first pressure area A1 in the first pressure space 11, as viewed in the direction of the valve seat 3 (that is to say, in the direction of the rotational symmetry axis 6).

The valve cone 2 has a projected effective second pressure area A2 in the second pressure space 12 in the direction away from the valve seat 3.

The valve cone 2 has a projected effective third pressure area A3 in the third pressure space 19, as viewed in the direction of the valve seat 3. The valve cone 2 has a projected effective fourth pressure area A4 in the inflow space 7 in the direction away from the valve seat 3. Here: A1<A2, A1>A4, A1+A3>A2, A1+A3=A2+A4. This means that, in the case of identical pressures $p_1$ in the first (A1) and fourth (A4) pressure space and a pressure $p_0$ in the second (A2) and third (A3) pressure space and $p_1 > p_0$, the pressure force overall on the area A1+A3 is greater than on the area A2+A4, which leads to a movement of the valve cone 2 toward the valve seat 3 and therefore makes closure of the valve 1 possible.

Furthermore, this means that, in the case of identical pressures $p_1$ in the first (A1), second (A2) and fourth (A4) pressure space and a pressure $p_0$ in the third (A3) pressure space and $p_1 > p_0$, the pressure force overall on the area A2+A4 is greater than on the area A1+A3, which leads to a movement of the valve cone 2 away from the valve seat 3 and therefore makes opening of the valve 1 possible.

As a result, the valve 1 can be opened and closed only by way of a change in the pressure between $p_1$ and $p_0$ in the pressure space 12 at constant pressures $p_0$ in the pressure space 19 and $p_1$ in the pressure space 11 and inflow space 7.

Furthermore, the valve 1 is automatically closed in the case of a pressure drop from $p_1$ to $p_0$ in the pressure space 12 and a pressure $p_1$ prevailing in the inflow space.

The valve cone 2 is configured for quick-action closure.

Therefore, the upper step 17 is assigned to the third pressure space 19 and the lower step 18 is assigned to the first pressure space 11.

In addition to the quick-action closure function, the actuator valve cone 5 also has a function for regulating the flow of steam.

Therefore, according to the invention, it is made possible by way of various geometries of the working spaces and the use of two thermodynamic more differentiated steam states that the valve 1 remains in the closed position in the case of prevailing process media at the pressures $p_0$ and $p_1$ and is opened by way of the targeted feed of the process medium $p_1$ into the pressure space 12.

The invention claimed is:

1. A valve for a turbomachine, the valve comprising:
    a quick valve body comprising a valve cone, and
    a valve seat,
    the valve cone being configured such that the valve cone is movable in a valve body with respect to the valve seat,
    the valve comprising a first pressure space which is configured in such a way that, in a case of loading in the first pressure space at a pressure p1, the valve cone moves in a direction of the valve seat,
    the valve comprising a second pressure space which is configured in such a way that, in a case of loading in the second pressure space at the pressure p1, the valve cone moves in a direction away from the valve seat,
    the first pressure space formed between the valve body and the quick valve body and comprising an effective first pressure area A1, as viewed in a movement direction of the valve cone toward the valve seat,
    the second pressure space formed between the valve body and the quick valve body and comprising an effective second pressure area A2, as viewed in a movement direction of the valve cone away from the valve seat,
    wherein: A1<A2.

2. The valve as claimed in claim 1, further comprising:
    an inflow space for feeding in process medium, and
    a feed line being configured in the valve cone or a feed line being configured in the valve body, which feed line connects the inflow space to the first pressure space in terms of flow regardless of a position of the valve cone.

3. The valve as claimed in claim 2,
    wherein the process medium comprises steam.

4. The valve as claimed in claim 1,
    wherein the valve comprises a third pressure space which is configured in such a way that, in a case of loading in the third pressure space at a pressure p0, a pressure force is exerted on the quick valve body in the direction of the valve seat.

5. The valve as claimed in claim 4,
wherein the valve cone is of tubular configuration, the quick valve body comprising an upper step on an end side, the upper step defining part of the third pressure space, and a lower step defining part of the first pressure space.

6. The valve as claimed in claim 4,
wherein the third pressure space comprises an effective third pressure area A3 in the movement direction of the valve cone toward the valve seat, wherein: A1+A3>A2.

7. The valve as claimed in claim 6,
wherein the valve cone comprises an effective fourth pressure area A4 in the movement direction of the valve cone away from the valve seat in an inflow space, wherein: A1+A3=A2+A4.

8. The valve as claimed in claim 7, wherein: A1>A4.

9. The valve as claimed in claim 1, further comprising:
an actuator valve cone which is arranged within the quick valve body and configured for regulating a flow of steam through the valve.

10. The valve as claimed in claim 1,
wherein the quick valve body is configured to interrupt a flow of a process medium through the valve in an event of a drop in a pressure of the process medium.

11. The valve as claimed in claim 1,
wherein the turbomachine comprises a steam turbine.

12. A valve for a turbomachine, the valve comprising:
a valve body comprising a valve seat, an annular wall defining a central passage in the valve body configured to house an actuator valve cone that is movable between being seated and not seated on the valve seat, an annular chamber concentrically surrounding the central passage, and a quick valve comprising a first end disposed in the annular chamber and a valve cone protruding from the annular chamber and configured to seat on the valve seat,
a first pressure space formed in the annular chamber between the valve body and the first end, and a second pressure space formed in the annular chamber between the valve body and the first end,
wherein when a first pressure in the first pressure space equals a second pressure in the second pressure space, a force from the second pressure that urges the quick valve away from the valve seat is greater than a force from the first pressure that urges the quick valve toward the valve seat.

13. The valve as claimed in claim 12,
wherein the first pressure space comprises an effective first pressure area A1 as viewed in a movement direction of the valve cone toward the valve seat,
wherein the second pressure space comprises an effective second pressure area A2 as viewed in a movement direction of the valve cone away from the valve seat, and
wherein A1<A2.

14. The valve as claimed in claim 12, further comprising the actuator valve cone.

15. The valve as claimed in claim 12, further comprising a working medium inlet and a working medium outlet,
wherein the quick valve comprises a passage between a valve cone port disposed in the valve cone and in constant fluid communication with the working medium inlet, and a first end port disposed in the first end and in constant fluid communication with the first pressure space.

* * * * *